United States Patent [19]

Morgott et al.

[11] 3,763,451

[45] Oct. 2, 1973

[54] CONTROL UNIT FOR ELECTRONIC SYSTEMS

[75] Inventors: Horst Morgott; Dieter Schmalzl, both of Munich, Germany

[73] Assignee: Siemens Aktiengesellshaft, Berlin and Munich, Germany

[22] Filed: Nov. 30, 1972

[21] Appl. No.: 310,765

[30] Foreign Application Priority Data

Dec. 15, 1971 Germany .................. P 21 62 306.3

[52] U.S. Cl. .............................................. 335/206

[51] Int. Cl. ...................... H01h 13/14, H01h 36/00

[58] Field of Search ..................... 335/205, 206, 207

[56] References Cited

UNITED STATES PATENTS 3,401,366 9/1968 Paholek et al. .................... 335/206

3,652,963 3/1972 Fox .................................. 335/205

3,652,964 3/1972 Chamberlain ....................... 335/205

*Primary Examiner*—Roy N. Envall, Jr.

*Attorney*—Benjamin H. Sherman et al.

[57] ABSTRACT

A control unit for electronic systems adapted for several control functions by selectively exchanging individual parts in an otherwise standardized construction adapted to be manufactured and assembled according to mass-production techniques utilizing interchangeable prefabricated elements. A printed circuit conductor plate is mounted in a housing comprised of a pair of identical complementary half members. A slide member is operable reciprocably in the housing to operate a switch wheel arranged to be driven step-by-step to operate a magnetic shunt and affect inductive switching elements on the conductor plate. The unit is adapted to be plugged into a supporting receptacle on a control panel.

20 Claims, 4 Drawing Figures

Patented Oct. 2, 1973 3,763,451

4 Sheets-Sheet 3

Patented Oct. 2, 1973 3,763,451

4 Sheets-Sheet 4

CONTROL UNIT FOR ELECTRONIC SYSTEMS

This invention relates to a new and improved control unit for electronic systems, and is especially constructed and adapted to be produced by mass-production techniques.

Electronic apparatus often contains so-called control fields or control panels for effecting swtiching, controlling, supervising and maintaining the system of the apparatus. Often a number of individual control devices are arranged on the control panels as conveniently as possible and have different functions to serve, for instance, as testing or indicator elements, as keys, as switches, as flip flop or trip switches, and the like, and are often coupled with a visual signal to show operational state.

Prior art control devices have been individually constructed in accordance with their particular functions. Thus the control panels have become crowded and generally require relatively large space because the dimensions of the control devices are not uniform. In addition, the prior devices are inefficient in that they cannot be connected into the signal and supply lines or conductors of their respective electronic systems without difficulty and especially where it is desired to employ automatic connecting or soldering techniques. With prior devices it has been difficult if not impossible to provide an arrangement wherein all connections of the control devices are in one plane and thus obtain the advantages of lower production cost and advantageous operational safety.

It is, accordingly, an important object of the present invention to overcome the foregoing and other disadvantages, deficiencies, inefficiencies, shortcomings and problems in prior structures and to attain important advantages and improvements by providing a new and improved control unit structure for the intended purpose as will hereinafter become apparent.

Another object of the invention is to provide a new and improved control unit construction adaptable for several operating functions by the provisions of means for selective interchange of individual parts in a generally standardized assembly.

A further object of the invention is to provide a new and improved control unit which is of small outer dimensions and provided with standardized connecting means so that it can be inserted into an operating field or on a control panel in a compact manner and enabling automatic connecting techniques to be employed in constructing the apparatus.

Still another object of the invention is to provide a new and improved control unit structure which will enable all connections of control units to be effected in one plane so as to have them arranged in integer multiples of a certain raster measure in a compact wiring field.

A yet further object of the invention is to provide a new and improved control unit of the character indicated which embodies maximum functions in a compact assembly enabling closely related, compact mounting of associated units in minimum space with nevertheless adequate access for operating and observing each unit and for mounting or dismounting any selected unit.

Other objects, features and advantage of the invention will be readily apparent from the following description of certain preferred embodiments thereof, taken in conjunction with the accompanying drawings although variations and modifications may be effected without departing from the spirit and scope of the novel concepts embodied in the disclosure, and in which.

Figure 1:
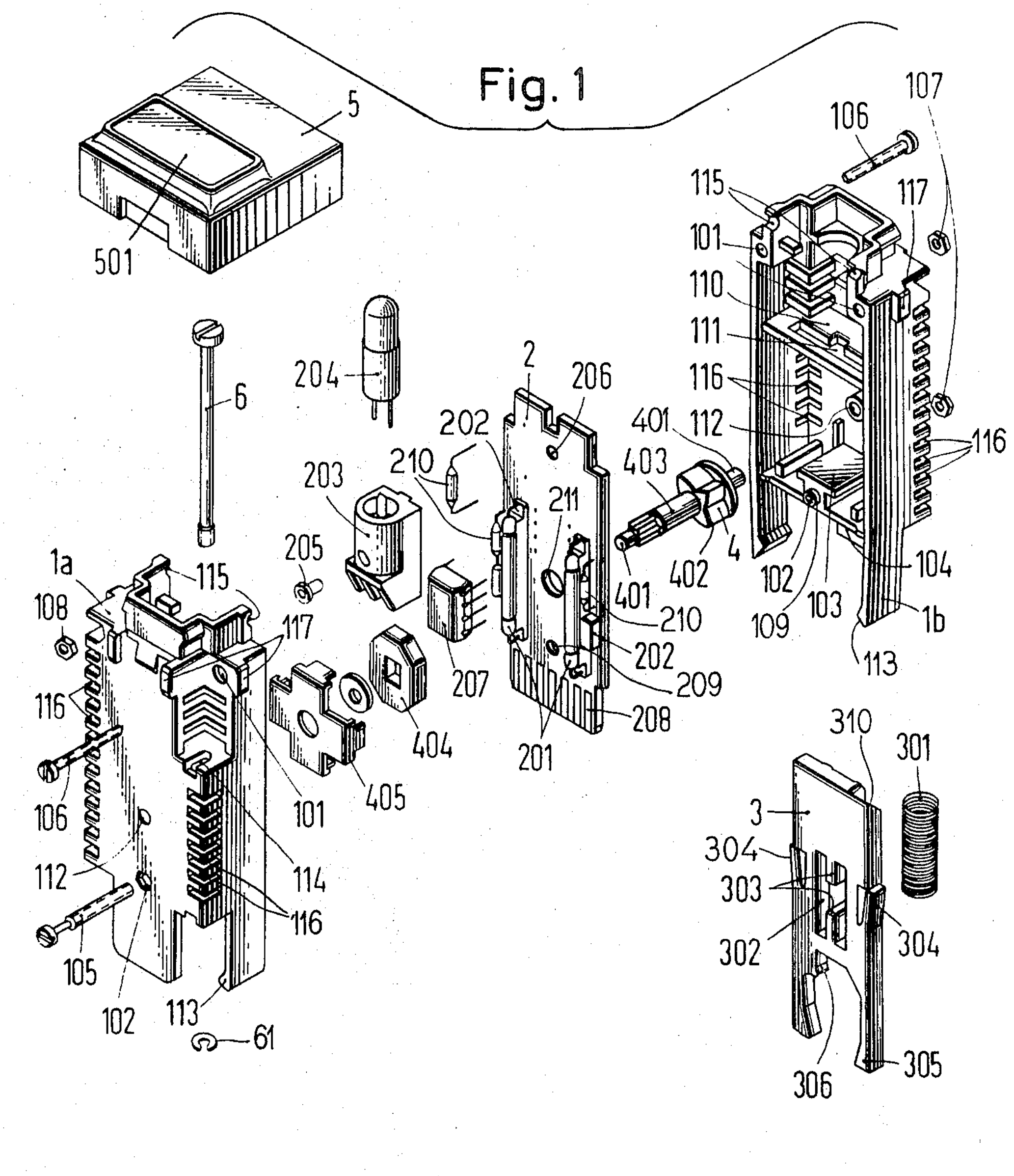
FIG. 1 is an exploded isometric assembly view illustrating the various components of a control unit as embodied in a switch.

Referring more particularly to the drawings, a control unit adapted to operate as a switch in an electronic system comprises a housing 1 (FIGS. 2 and 3) having two similarly constructed and preferably identical, complementary half housing elements 1a and 1b which are adapted to be secured together by means of screws. Each of the housing halves is adapted to be made as an injection molded plastic part.

To aid in securing the housing members 1a and 1b together, each of them is provided with two bores 101 positioned at the same level in the upper end portions of the members, and a parallel centered bore 102 in the lower portion of the member and extending through a generally T-shaped formation 103 extending from the main wall of the member and with the narrow or foot portion of the formation integral with a horizontally arranged transverse web 104 which interconnects the side walls of the member. In assembly, the bores 101 and 102 of the two housing members match and cylindrical screws are received through the matching bores, a screw 105 extending through the bores 102 and screws 106 extending through the bores 101, nuts 107 and 108 being secured to the screws.

Means are provided within the housing 1 for efficiently and compactly supporting all electrical elements required for the desired functions of the control unit, such as in a raster-forming electronic system in which the unit may be one of a battery of cooperatively related and desirably similarly constructed units. To this end, a conductor plate 2 is mounted longitudinally centrally within the vertically elongated housing, symmetrically between the two semihousings **1*a* and 1*b*. Each of the webs 104 is equally inset to receive the plate 2 closely therebetween. On the plate 2 are carried all electrical elements required for functioning of this unit, with suitable printed circuit conductors provided on one face of the plate, in this instance the face engaged with the semihousing 1*b*, while the opposite face carries electrical elements and devices such as a pair of reed contacts 201 upon laterally spaced vertically extending coextensive parallel mounting members 202 on the conductor plate or printed circuit board 2**.

On its upper end portion, the panel 2 carries signal lamp means, being provided for this purpose with a lamp supporting frame or socket member 203 to receive a signal lamp bulb 204. Attachment of the socket 203 to the electrical element carrying face of the panel may be, as shown, by means of a rivet 205, the panel being provided for this purpose with a rivet hole 206 located on the longitudinal axis of the panel. To facilitate the signalling function of the lamp 204, an indicator amplifier 207 (FIG. 1) is suitably mounted on the panel 2.

On its lower end, the panel 2 is provided with a contact tongue 208 extending downwardly and provided with conductor paths connected with the printed circuit conductors on the panel, and providing terminals therefor.

Proper centered orientation of the printed circuit board panel 2 within the housing is assured by means of tubular cylindrical dowel projections 109 integral with the inner ends of the respective T-pieces 103 concentric with the bores 102. These dowel projections together are of a length about equal to the thickness of the plate 2 and they are of a diameter to fit them closely within a bore 209 in the lower end portion of the plate 2. Thus, when the bolt 105 is extended through the bores 102 and tightened, the plate 2 will be held firmly in place against displacement longitudinally or transversely.

In addition to the electrical elements already mentioned as carried on the panel 2, any additional electrical elements suitable for proper functioning of the unit in an electronic system may be mounted thereon such as capacitors 210 (FIG. 1). Suitable holes extending through the panel 2 provide for extension there through of leads from the several electrical elements for connection with the appropriate printed circuit leads on the opposite side of the circuit board panel, as is customary.

Mounting of the important actuating slide plate 3 within the housing 1 is in a manner to maintain the slide plate normally biased upwardly. To this end, means are provided for supporting the plate 3 in spaced parallel relation to and adjacent to the printed circuit face of the panel 2. For this purpose, the plate 3 is vertically guided in a horizontal transverse web 110 within the semihousing 1b provided with a guide aperture 111 providing vertical guide surfaces and elongated perpendicularly to the two lateral walls of the semihousing. In shape, the aperture 111 is complementary to that of the portion of the slide plate 3 to be received therein.

Figure 2:
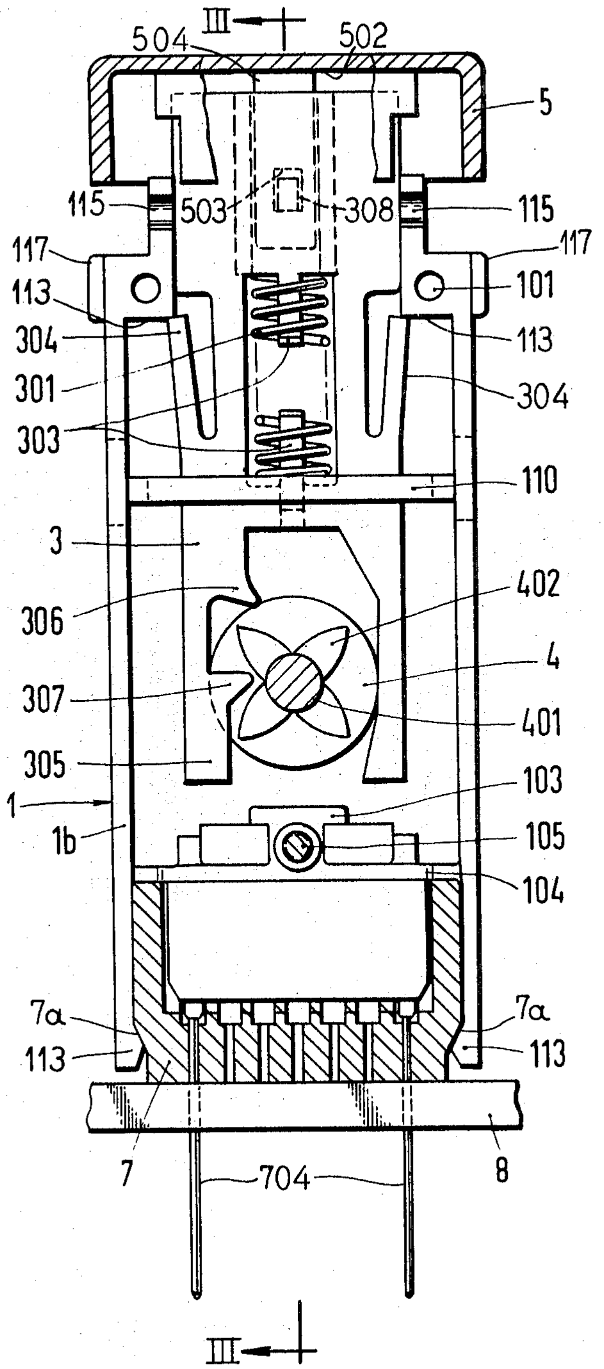
FIG. 2 is a vertical sectional detail view taken substantially along the line II—II of FIG. 3.
Figure 3:
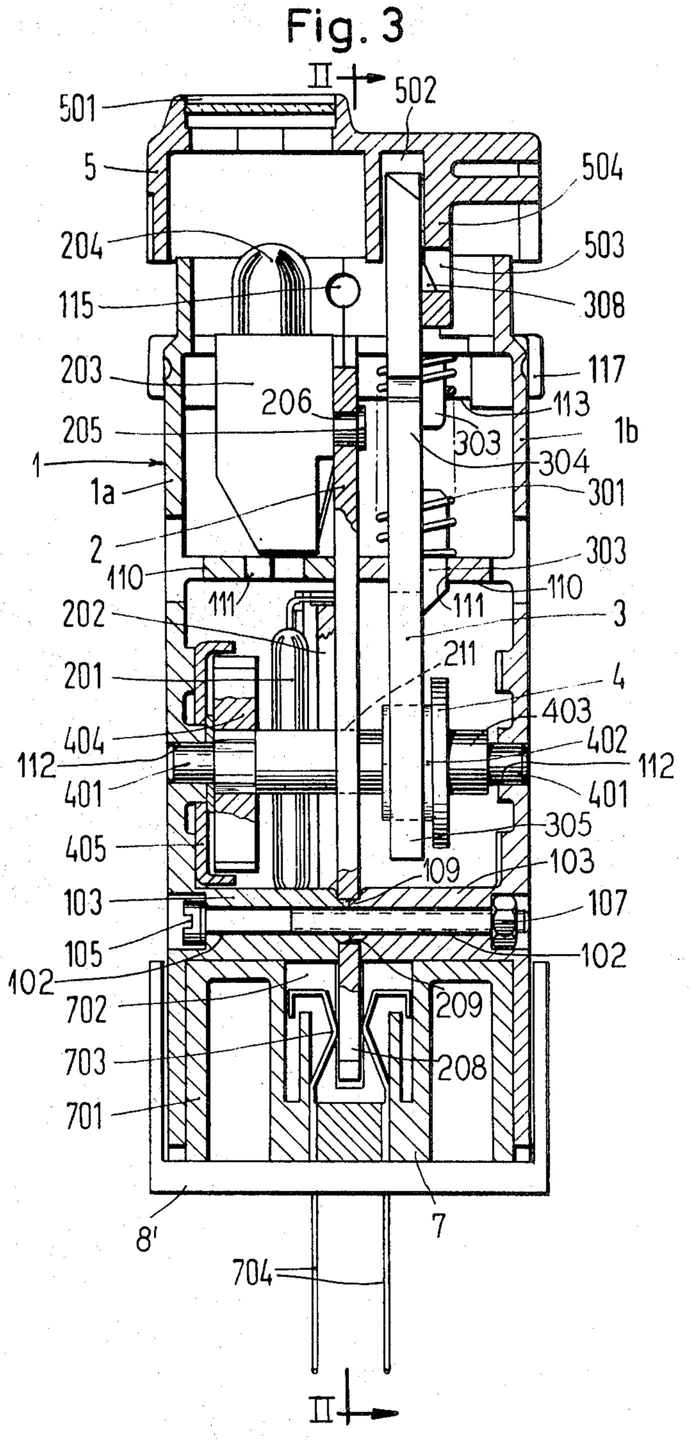
FIG. 3 is a sectional elevational detail view taken substantially along the line III—III of FIG. 2.

Biasing of the slide plate 3 is effected by means comprising a coiled compression spring 301 received in a vertically oriented centered generally H-shaped aperture 302 medially in the plate. Centrally of the aperture 302 is a pair of spring-retaining studs 303 which project toward one another in axial alignment and which project into the respective opposite ends of the spring (FIG. 2 and 3). The studs 303 are located within the plane of the face of the plate 3 which faces toward the panel 2, but extend in offset relation to the opposite face of the plate 3 so that the lower end of the spring 301 will overlie and engage against the upper face of the web 110 serving as a supporting ledge. Thereby, since the upper end of the spring 301 engages the plate 301 in the upper end of the aperture 302, the plate is normally biased upwardly by the spring. Limit upon upward movement of the plate 3 is controlled by a pair of stop fingers 204 integral with and having their ends projecting upwardly at the respective opposite longitudinal edges of the plate to engage downwardly facing respective stop shoulders 113 provided on the associated semihousing member, in this instance the member 1b. In a desirable construction, the stop fingers 104 are constructed as resiliently springy tongue-like members partially separated from the respective sides of the plate and spaced therefrom along their inner sides so that during assembly of the plate with the housing member, the plate carrying the spring 301 can be slid into position from above into the guide aperture 111 and then pressed down until the stop fingers snap into engagement under the shoulders 113.

Means are provided on the plate 3 for driving the switching wheel 4 either rotatably step-by-step where the unit is to serve as a stepping switch or to drive the wheel oscillatably where the unit serves as a key. For this purpose, the lower end portion of the plate is provided with a pair of laterally spaced legs 305 which straddle a pinion portion 402 of the wheel 4 provided with a plurality, in this instance four, long, equally spaced teeth respectively engageable by means of a switching nose 306 (FIG. 1 and 2) provided integrally on the inside upper portion of one of the legs 305 to overlie one of the pinion teeth at the side of the pinion toward which the wheel is to be rotated. Spacing of the teeth of the pinion 402 is such that where the wheel 4 is to be steppingly rotated, the nose 306 can escape the succeeding tooth during the return, resetting movement of the slide plate 3 after each wheel advancing stroke of the plate. On the other hand, where the control unit is to serve as a key, so that the switching wheel 4 is merely to be oscillated, the same leg that carries the nose 306 may be provided with a second switch nose 307 spaced below the nose 306 so as to project into the space between the tooth of the pinion 402 which the nose 306 overlies and the next succeeding tooth so that the single tooth over which the nose 306 lies is in effect underlain by the nose 307. Thereby in each depressing stroke of the plate 3, the wheel 4 will be partially rotated to the extent permitted by the stroke of the nose 306, and then returned reversely by the nose 307 in the resetting stroke off the plate, thereby imparting an oscillating movement to the wheel 4 driving it in a partial rotation and then returning the wheel to its initial position. The two functional constructions of the plate 3 are contrasted in FIGS. 1 and 2, FIG. 1 showing the plate with only the nose 306 and FIG. 2, for illustrative purposes showing the plate as provided also with the return stroke nose 307.

Mounting of the wheel 4 in alignment with the plate 3 is through an axle 403 corotative therewith and provided with respective opposite end trunnions 401 journaled in respective aligned bearing bores 112 in the housing members 1a and 1b, the shorter portion of the axle shaft being journaled in the housing 1b and the longer portion being journaled in the housing 1a, with a clearance and mounting bore 211 in the panel 2 enabling passage of the shaft there through and also serving in cooperation with the studs 109 to retain the plate against displacement within the housing.

Rotary or oscillating movements of the wheel 4 transmitted through the axle shaft 403 are for the purpose of turning a permanent magnet 404 which is keyed corotatably on that portion of the shaft 403 which extends across the space between the reed contacts 201 and the main wall of the housing member 1a. A four-arm pole plate 405 fixedly mounted on the inside of the wall of the member 1a concentric with the shaft 403 between the housing member wall and the magnet 404 has the arms extending into pole positions along the perimeter of the magnet which, as best seen in FIG. 1 is of generally elongated geometrical form with its poles arranged to approach the respective pairs of pole arms as closely as practicable.

Driving of the actuating slide plate 3, according to one embodiment of the invention, is by means of the cap 5 which serves as a combination closure cap for the upper end of the housing, an actuating button, and sighting window. To this end, the cap 5 is constructed and arranged to be mounted on the upper end of the plate 3 and is provided with a sighting window 501 in that portion thereof which overlies the signal bulb 204 so that light from the bulb can be viewed through the window from above. Mounting of the cap 5 on the upper end of the plate 3 for longitudinal movement therewith and on the axis of the unit 1 is effected by receiving the upper end portion of the plate in a downwardly opening groove 502 in the cap. An interlocked relationship of the cap and plate is effected by means of a downwardly projecting interlock shoulder nose 308 on the upper portion of the plate projecting into an interlock aperture 503 in a depending flange 504 extending vertically downwardly from the bottom of the cap 5 aligned with one side of the slot groove 502. Thereby downward pressure applied to the cap 5 is transmitted to the plate 3 to actuate the plate in a downward transmission wheel driving stroke in opposition to bias of the spring 301, and the spring 301 returns the plate and the cap to initial position upon release of the downward pressure. The plate 3 thus acts as a drawing plunger.

To facilitate mounting of the unit 1 on the electrical socket 7 by downward movement, the lower end portions of the lateral walls of the housing members **1*a* and 1*b* are separated from the main wall portions of the members and are resiliently flexible so that inwardly projecting cam-shaped latching lugs 113 on the lower end portions of the resilient latching flange extensions of the lateral walls are adapted to engage in sliding relation with the sides of the body of the socket 7 with spreading yielding of the flange extensions until the generally upwardly facing but oblique latching shoulders of the lugs engage with complementary oblique generally downwardly facing keeper shoulders 7*a* on the body of the member 7 as best seen in FIG. 2. In this latch relationship, the bottom of the webs 104 of the housing members engage in stable supporting relation on the top of the body of the socket member 7, against which the latching, caming action of the lugs 103 firmly draw the webs. In this mounted position, the downwardly extending flange portions of the main walls of the housing members 1*a* and 1*b* engage the remaining sides of the body of the socket 7 in stabilizing relation. Where further assurance against displacement of the unit from the socket 7 is desired, the unit may be bolted to the socket as by means of a screw or bolt 6 extending through a vertical bolt hole 114 in either of the housing members and threaded into the body of the socket 7. Any tendency toward vibrational release of the screw 6 may be prevented by applying a C-shaped retaining washer 61** thereto.

For ventilating the interior of the housing and dissipating heat that may be generated therein, a number of horizontally extending slots 116 are desirably provided in the corner areas of the housing members **1*a* and 1*b*. To assure efficient ventilation even though the unit 1 is compactly arranged in an operating relationship with like units, spacer lugs 117 are provided on the housing members above the slots 116** at the four corners of the housing members. Thereby each of the units in an assemblage of such units spaces itself from its neighbor. Thereby not only is an optically desirable and compactly mounted arrangement attained but efficient ventilation of the assemblage of units is assured.

Although for purpose of illustration only one of the units 1 is shown in the drawing, it will be understood that an operating field or panel board will contain a number of such units in a raster form arrangement of the supporting spring sockets 7 mounted on the panel 8 which may be merely a flat panel as shown in FIG. 2 or may be a generally channel shaped member 8' as shown in FIG. 3. In any event, each of the sockets 7 comprises a housing 701 within which is a contact chamber 702 having mounted therein spring flange contacts 703 which are electrically insulated from one another and extend from the lower end of the socket end on through the mounting panel 8 or 8' to provide contact pins 704 which may be connected in a rastered wiring field which may be effected by means of the so-called wire-wrap technique. An important advantage of the present invention thus becomes readily apparent since it will be seen that the operating field comprising an arrangement of the control units 1 plugged into position from above with their respective receptacle members 7, renders the wiring operation of the control unit independent from the mounting of the individual control units. In addition, an individual control unit 1 can easily be exchanged in the operating field at any time so that maintenance is greatly simplified. In order to avoid any operating errors, the terminals of the contact tongue flanges 208 of the units are standardized and positioned in such a way that it is possible without difficulty to replace, for example, a switch by key or even an indicator unit without thereby allowing an electrical mistake to occur in the connected signal lines. As will be apparent upon mounting the unit 1 on the socket 7, the contact tongue flange 208 automatically effects contact engagement with the respective spring contacts 703 of the socket.

In operation of the unit 1 as a stepping switch, wherein the drive plate 3 is provided with only the advancing nose 306, the nose 306 will engage with the subjacent tooth of the pinon 402 of the switching wheel 4 and will cause the wheel to turn counterclockwise as viewed in FIG. 2. This action overrides the magnetic field of the permanent magnet 404 closed via the adjacent arms of the pole plate 405. As soon as the magnet poles leave the magnetic field between two of the arms of the pole plate and approach the succeeding arms, the magnet will tend to snap the stepping shaft in that direction rapidly and fully assume the new position 90 degrees from the initial position upon retraction of the actuating plate 3, and the next succeeding pinion tooth will be in position for a succeeding cycle of operation. Thereby, operating as a stepping switch, the unit 1 performs quickly for a cyclical operation.

Where the control unit 1 is to function as a key, then the actuating slide 3 will be equipped with the second switch nose 307, having the effect of resetting the switch wheel back to its initial position in each cycle of operation. Thereby as soon as the housing plunger cap 5 is released, the plunger slide plate 3 will move in its upward direction and by means of the reset nose 307 engaging the driving tooth of the pinon 402 cause the switch wheel 4 to rotate clockwise as viewed in FIG. 2, that is return the same to the initial position of the permanent magnet 404 relative to the pole plate 405.

In either arrangement, the permanent magnet 404 tries to assume one of its four rest positions and thereby to short-circuit the magnetic flow via the smallest possible air gap. This assures fairly strong holding of the magnet 404 in its selected rest positions between the respective pairs of pole plate arms within 90° increments of movement.

In the turning of the permanent magnet 404, it has a magnetic shunting effect on the adjacent two reed contacts 201. Thus, as the magnet moves toward and nearly assumes an at rest position between a pair of the pole plate arms, the reed contact tongues close. This switching action has an effect on individual signal lines of the wiring field via the conductor paths printed upon the printed circuit face of the plate 2, being conducted on through the corresponding contacts on the contact tongue flange 208 and the contacts 703 and the contact pins 704 associated therewith. Moreover, simultaneously the circuit closing function may be optically indicated by the bulb 704 serving as the indicator element. Necessary power supply for the bulb 204 is provided through the indicator amplifier 207. Thereby the indicator window 501 on the housing cap 5 is illuminated.

Figure 4:
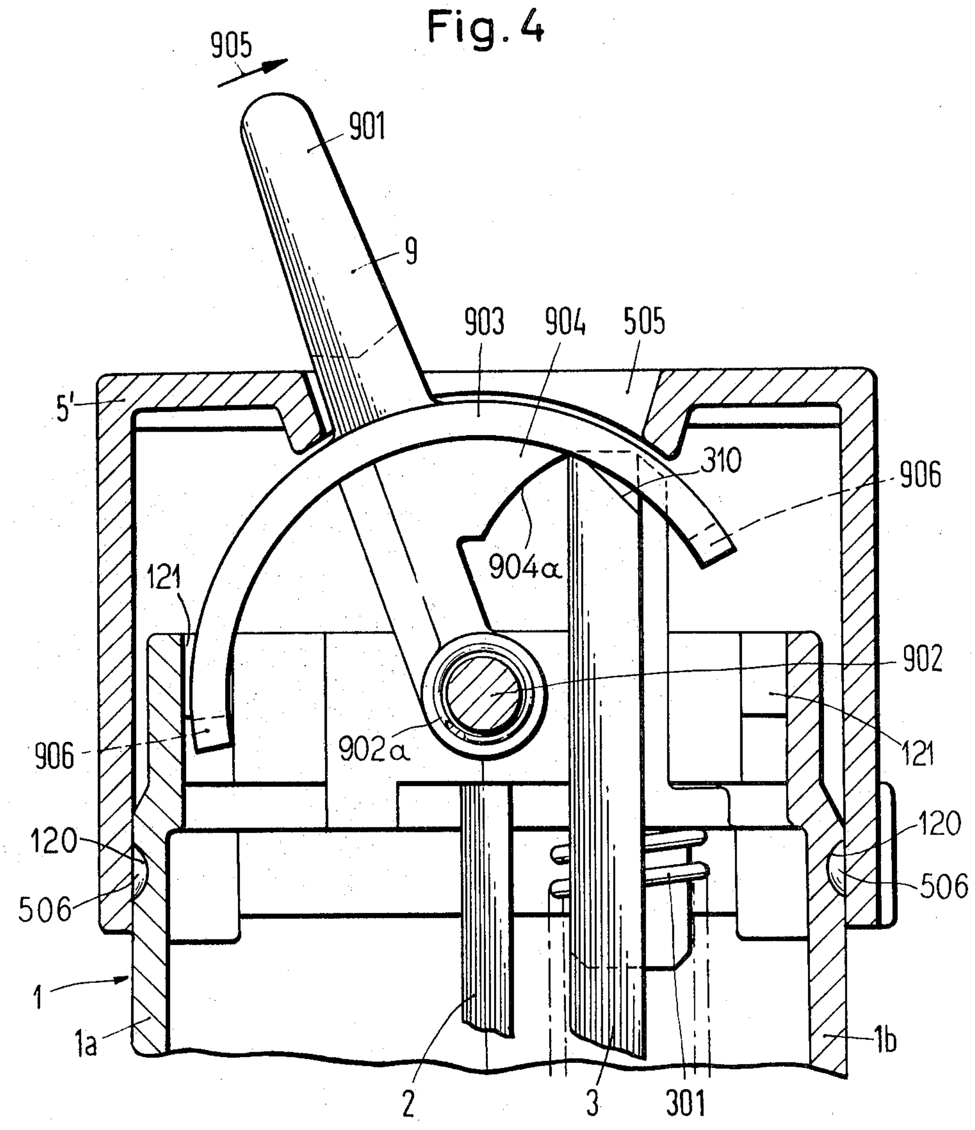
FIG. 4 is a fragmentary sectional detail view taken in substantially the same plane as FIG. 3 but showing only the upper portion of the unit and depicting an operating element wherein the unit serves as a flip flop switch.

Operation of the unit 1 as a flip-flop switch is adapted to be effected, as depicted in FIG. 4 in a more or less schematic fashion. In this arrangement, a closure cap 5' is fixedly secured on the upper end of the housing. This can be effected, for example, by means of integral detent nibs 506 extending inwardly on flexible lower end portions of walls of the cap 5' and snappingly engaged in complementary socket recesses 120 provided for this purpose in upper end portions of the housing members 1a and 1b. In the crown end of the cap 5' is an elongated slot opening 505 through which an upwardly projecting handle or toggle arm 901 of a flip-flop lever 9 projects. Mounting of the lever 9 on the upper end portions of the housing members 1a and 1b is desirably effected by means of an axle shaft 902 which has its axis transversely between the confronting edges of the housing members which for this purpose are provided with matching semi-circular bearing recesses 115. Thereby the flip-flop lever is rotatably movable on its axle 902. Under the clearance slot 505 in the housing cap, the lever 9 has a semi-circular segment 903 which, in effect, closes the opening. Operation of the driving plunger plate 3 is effected by means of a cam vane 904 on the lever 9 disposed immediately below the segment 903 and in a plane perpendicular to the axis of the axle 902. A cam surface 904a of the vane 904 engages the upper edge of the slide plate 3 aligned with a clearance notch 310 in the upper edge of the plate to accommodate the arcuate segment 903. The curved shape of the edge 904a is selected to be operative to thrust the slide 3 downwardly when the flip-flop lever 9 is actuated in the direction of the arrow identified as 905, thereby to effect the switching function of the control unit in the manner already described.

Where it is desired to provide the flip-flop switch with means for locking it in either of its opposite rotated positions, so that it cannot be operated by mistake or by faulty operation, the lever is adapted to be mounted for axial longitudinal movement along the axle 902 with a compression spring 902*a* operating to thrust the lever along the axle in one direction. For example, the spring thrust may cause the lever to be thrust toward respective locking shoulder elements 121 on the housing members 1*a* and 1*b* such that either of respective fixed detent projections 906 on the respective end portions of the lever segment 903 will be maintained in latching engagement under the respective shoulder 121, depending on which of the latching detents is oriented with respect to its shoulder. Through this arrangement, the flip-flop lever will be held against pivoting until it is deliberately thrust along the axle 902 in opposition to bias of the spring 902*a* to disengage the latching detent from its keeper shoulder.

Various other modifications of the control unit other than the embodiments shown by way of illustration can be readily envisioned. While it is possible to embody the control unit as a single indicator it may be embodied as a register indicator by subdividing the indicator field. For this purpose another lamp socket may be mounted to receive the bulb of another indicator on the opposite side of the conductor plate 2. Of course individual electrical elements can be changed or exchanged to meet various requirements. For instance, so-called field plates can be applied as inductively energizable switch elements in place of the reed contacts which have been shown. Such field plates may be in the form of semi-conductor component elements which are based on the utilization of the resistance change of conductors containing current in a magnetic field, and which have been frequently used in recent times. Also, the bulb used as an indicator element may be replaced by semi-conductor element, such as a luminescent diode. Such a luminescent diode as compared with a bulb has the advantage that it uses essentially less electric current and for this reason can be supplied directly via the signal voltages.

In the described example, a simple longitudinally pole permanent magnet has been provided, but that may be replaced by a multi-pole permanent magnet with, for example, two pairs of poles.

It might also be pointed out that the housing cap 5 instead of being longitudinally movably mounted in a key or switch assembly, may be firmly attached to the top of the housing in the manner of the cap 5' and to provide the slide 3 with a key head plunger for effecting driving operation of the slide and operating through an opening in the crown of the cap adjacent to the indicator window.

From the foregoing it wil be appreciated that the present invention provides a control unit that has numerous advantages among which may be mentioned that it can be assembled as desired individually or in mosaic with other such units to meet various operating field requirements. The unit can be plugged into the operating field from above and can thus be exchanged easily for easy maintenance. Operating fields for electronic systems can be economically provided since the control units comprise interchangeable parts and the wiring of the operating field can be effected by automatic techniques such as the wire-wrap technique or other connecting techniques such as multi-layer plates or wiring frames. Further, greater freedom in construction of the operating fields is permitted because it is possible without difficulty to exchange individual control units in their relative positions.

It will be understood that variations and modifications may be effected without departing from the spirit and scope of the novel concepts of this invention.

We claim as our invention:

1. A control unit for electronic apparatus such as in a raster-forming operating field:

a housing;

conductor means mounted within said housing and supporting inductively excitable switching means;

means for mounting said housing and for connecting the switching means to an electronic circuit to be controlled thereby;

a permanent magnet;

means supporting said magnet in operative adjacency to said switching means;

pole means fixed with relation to the housing and related to the magnet to normally retain it in predetermined rest positions; and means for driving said supporting means whereby to effect movement of said magnet relative to said pole means and said switching means to provide a magnetic shunt for exciting the switching means.

2. A control unit according to claim 1, wherein said housing comprises two complementary housing members, said conductor means comprising a panel engaged by and between said housing members, and means securing said housing members together with the panel clamped therebetween.

3. A control unit according to claim 2, said driving means comprising a plunger slide plate reciprocably guided in said housing, said supporting means comprising a shaft having a toothed switch wheel thereon, said plate having a projection thereon engageable with a tooth of said wheel to advance said wheel a tooth increment by reciprocable movement of the plate in one direction.

4. A control unit according to claim 3, including a second spaced projection on said plate for engaging said tooth to reset the shaft and magnet in a return stroke of the plate.

5. A control unit according to claim 1, wherein said conductor means comprise a panel having a contact flange portion extending downwardly in a lower portion of the housing and provided with terminal means for engagement with electrical contacts of an electrical receptacle.

6. A control unit according to claim 1, including means on a lower end portion of said housing for snap latching engagement with a supporting electrical receptacle, and means for effecting electrical connection of said conductor means with contact means of the receptacle.

7. A connector according to claim 1, wherein said driving means comprise an elongated plunger slide plate, a coiled compression spring, said plate having an aperture therein receptive of the spring with its axis extending in the longitudinal direction of the plate axis, studs on the plate projecting in alignment from opposite longitudinal ends of the aperture and engaged in opposite ends of the spring to retain the spring in position relative to the plate, and a support on the housing engaged by one end of the spring whereby the spring develops a return bias when the plate is shifted to thrust the spring against the support.

8. A control unit according to claim 1, comprising a stepping switch, wherein said driving means include a member having an actuating projection, said supporting means comprising a shaft, a motion transmission pinion on said shaft including a plurality of successive teeth, said projection being related to said teeth to engage one of said teeth by actuation of the plunger means to turn the shaft and thereby rotate the magnet from a rest position relative to the pole member to shift into an intermediate position relative to the succeeding rest position of the magnet and the next succeeding tooth engages the projection until the plunger means moves into a reset position whereupon the succeeding tooth is released and the magnet automatically moves into the next succeeding rest position.

9. A control unit according to claim 1, including a closure cap relatively movably mounted on an upper end of said housing, said driving means comprising a plunger connected to said cap and operable by depressing said cap relative to said housing.

10. A control unit according to claim 9, including a window in said cap, and a visual indicator carried by said conductor means and observable through said window.

11. A control unit according to claim 1, including visual indicator means carried by said conductor means and including a lamp, and a current supply amplifier also carried by said conductor means and connected with said bulb.

12. A control unit according to claim 1, wherein said inductively sensitive switching means comprise reed contacts supported by said conductor means closely adjacent to the magnet.

13. A control unit according to claim 1, wherein said inductively sensitive switching means comprise field plate means supported by said conductor means closely adjacent to said magnet.

14. A control unit according to claim 1, wherein said conductor means include a printed circuit panel having a contact flange provided with an identical set of contacts according to a standardized arrangement in order to avoid faulty assembly with contacts of a receptacle into which the contact flange is adapted to be inserted.

15. A control unit according to claim 1, wherein said housing comprises a complementary housing members assembled together, and lateral spacers on the outside of said members for maintaining a spaced relation of the housing relative to contiguous structures such as other control units or boundary structure of an operating field.

16. A control unit according to claim 1, including a flip-flop lever pivotally mounted on an axle supported by said housing and including a toggle projection from the housing and a plunger controlling surface, said driving means comprising a plunger, said surface engaging the plunger to actuate the plunger in the pivotal movement of the lever.

17. A control unit according to claim 16, wherein said lever is movable longitudinally relative to said axle; a biasing spring normally thrusting the lever in one direction along said axle; said lever including a segment arranged concentric to the axis of the axle and having respective opposite ends provided with detents; and keeper means on said housing engageable by said detents under the bias of said spring against the lever, and from which the detents are separable by shifting the lever in opposition to the spring bias.

18. A control unit according to claim 1, wherein said conductor means comprises a panel having said inductively excitable switching means mounted on one face thereof and said face is adjacent to said magnet, printed circuit means on an opposite face of said panel, said driving means comprising a plunger slide plate, said housing having means slidably guiding said plate in adjacent spaced relation to said printed circuit face of said panel, said supporting means comprising a rotary shaft journaled in said housing and extending through said panel and plate, a toothed switching wheel mounted on said shaft adjacent to said plate, and a projection on said plate engageable with said toothed wheel to turn said shaft and thereby the magnet in sliding movement of said plate in one direction.

19. A control unit according to claim 18, including a spring normally biasing said plate in a direction opposite to said one direction, and stop means on said plate and on said housing limiting the movement of said plate due to spring bias in said opposite direction.

20. A control unit according to claim 1, wherein said conductor means comprise a panel having a contact flange extension on its lower end projecting from one end of said housing, an electrical receptacle having contact means, said one end of the housing being engageable with said receptacle and thereby effecting engagement of said contact means with said contact flange, means on said one end of the housing retainingly engageable with said receptacle, and means supporting said receptacle.

* * * * *